United States Patent

[11] 3,542,424

| [72] | Inventors | George W. Bingley<br>Stow;<br>Nazir M. Khan, Cuyahoga Falls, Ohio |
|---|---|---|
| [21] | Appl. No. | 779,028 |
| [22] | Filed | Nov. 26, 1968 |
| [45] | Patented | Nov. 24, 1970 |
| [73] | Assignee | Massey-Ferguson Inc.<br>Des Moines, Iowa,<br>a corporation of Maryland |

[54] MOVABLE SEAT ASSEMBLY
9 Claims, 5 Drawing Figs.

[52] U.S. Cl. ............................................. 297/349, 296/65
[51] Int. Cl. ........................................... A47c 1/02
[50] Field of Search .................................. 297/349, 240; 296/65; 248/416, 418, 425

[56] References Cited
UNITED STATES PATENTS

| 2,650,647 | 9/1953 | Macknight | 248/415X |
| 2,700,411 | 1/1955 | Lamb | 297/349X |
| 3,076,517 | 2/1963 | Biabaud | 297/65 |
| 3,186,761 | 1/1965 | Popst | 297/349 |

Primary Examiner—James T. McCall
Attorney—Tweedale and Gerhardt

ABSTRACT: A movable seat assembly includes a seat pivoted to a support which is pivotally mounted on a vehicle. Latch means are provided for permitting pivotal movement of the seat only or combined pivotal movement of the seat and the support to enable the seat to assume several different spaced and pivoted positions.

INVENTORS
GEORGE W. BINGLEY
BY NAZIR M. KHAN
Tweedale & Gerhardt
ATTORNEYS

INVENTORS
GEORGE W. BINGLEY
BY NAZIR M. KHAN

Tweedale & Gerhardt
ATTORNEYS

INVENTORS
GEORGE W. BINGLEY
BY NAZIR M. KHAN
Tweedale & Gerhardt
ATTORNEYS

MOVABLE SEAT ASSEMBLY

This invention relates generally to seats and more particularly to a seat assembly which is movable to several positions.

Many vehicles, such as a tractor with a rear mounted backhoe, are operated by a single operator who must use two different seating positions to drive the vehicle and to operate the backhoe. To accomplish this, two separate seats must be provided or, more conveniently, a single movable seat must be provided.

Previously, seats have been designed which merely pivot between a forward and a rearward orientation. However in a tractor with a backhoe, such an arrangement is not adequate because mere pivotal movement of the seat will not properly position the operator at both sets of controls. To overcome this, seats have been designed which may be displaced and pivoted to properly position the operator at both sets of controls. These seats use a complicated and expensive mechanism that automatically displaces the seat when pivoted. However it is sometimes advantageous for the operator to move the seat to a different pivotal position without displacing the seat. Such movement is not possible with conventional seat assemblies described above.

It is therefore an object of this invention to provide a movable seat assembly which has a latch mechanism permitting the seat to be independently pivoted or concurrently pivoted and displaced at the option of the operator.

In accordance with this invention, a movable seat assembly comprises a support, means mounting the support on a vehicle for pivotal movement relative thereto, a seat, means mounting the seat on the support for pivotal movement relative thereto, and latch means movable between a first position securing the seat against pivotal movement relative to the support and securing the support against pivotal movement relative to the vehicle, a second position permitting pivotal movement of the seat relative to the support and securing the support against pivotal movement relative to the vehicle, and a third position permitting both pivotal movement of the seat relative to the support and pivotal movement of the support relative to the vehicle.

These and further objects, features and advantages of this invention will become more readily apparent upon reference to the following detailed description of a preferred embodiment, with reference to the annexed drawings, wherein.

Figure 1:
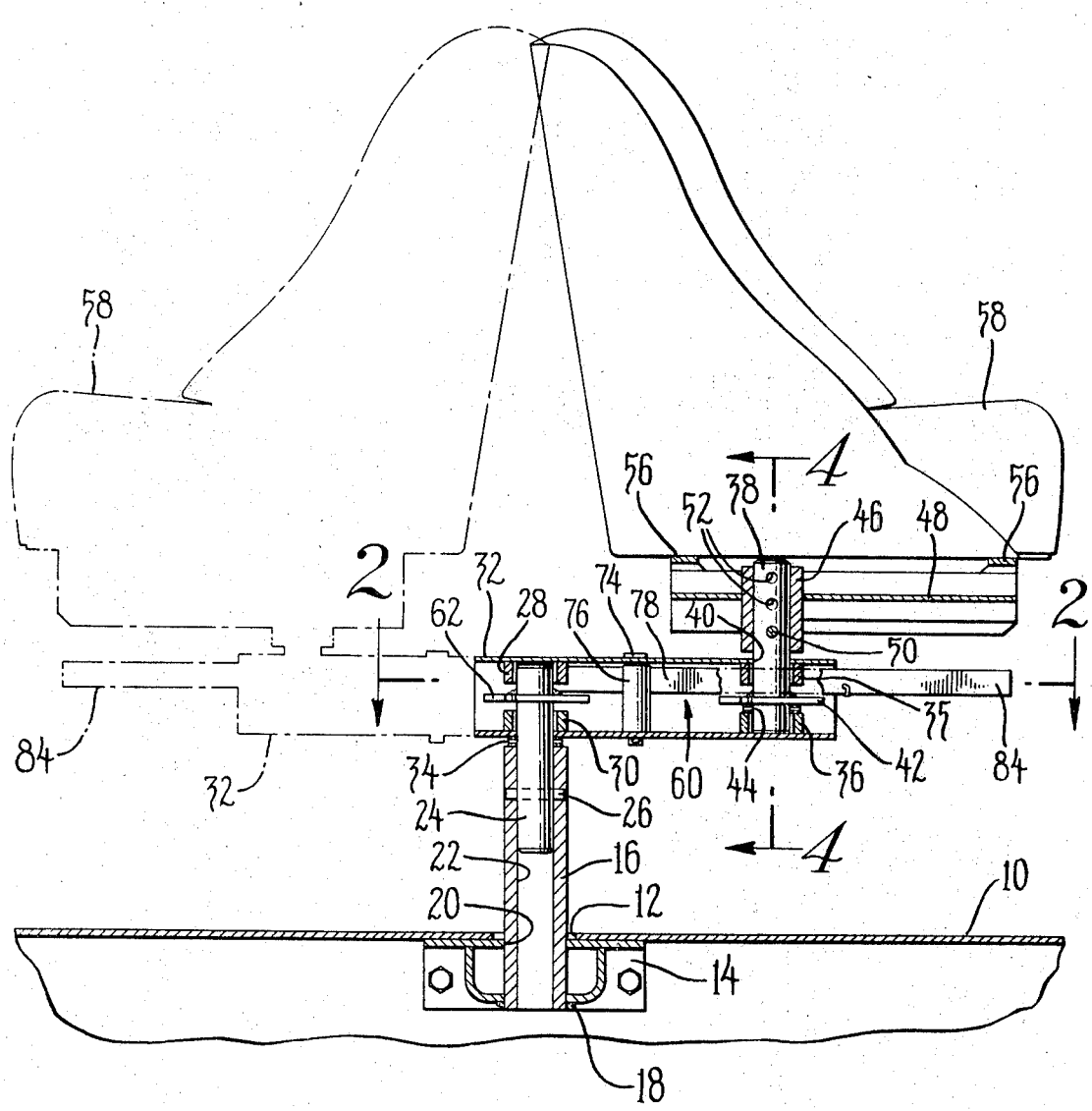
FIG. 1 is a side elevation of a movable seat assembly according to this invention, partially broken away to show the latch mechanism and illustrating two positions of the seat assembly.

Referring now to FIG. 1 of the drawings, a vehicle (not shown) has an operator's platform 10 which is apertured at 12 and beneath which a bracket 14 is mounted. An elongated cylindrical mounting collar 16 is welded at 18 to bracket 14 and extends upwardly through bracket aperture 20 and aperture 12. The central bore 22 of collar 16 receives a pivot shaft 24 which is secured to collar 16 by a radial locking pin 26.

At its upper end shaft 24 is received within alined cylindrical collars 28 and 30 of a support 32. Annular needle bearings 34 pivotally mount support 32 on the upper end of collar 16. Support 32 is a two piece rectangular boxlike structure bolted together and open at either end and mounts a pair of alined cylindrical collars 35 and 36 spaced from collars 28 and 30. Another pivot shaft 38 has its lower end extending downwardly through an aperture 40 above collar 35. Adjacent its lower end, shaft 38 mounts an annular plate 42 which is supported on top of collar 36 by annular needle bearings 44.

Figure 4:
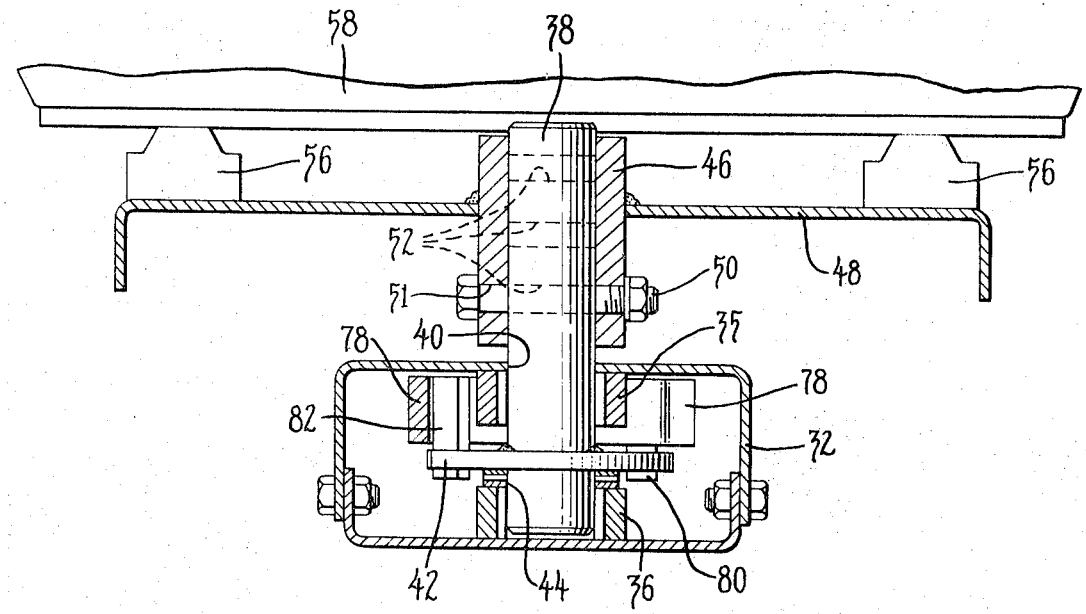
FIG. 4 is an enlarged sectional view taken generally along lines 4-4 of FIG. 1.

As shown in FIG 4, the upper end of shaft 38 journals a cylindrical collar 46 which mounts a seat support frame 48 thereon. Collar 46 and seat frame 48 are located vertically with respect to shaft 38 and held against rotation by a bolt 50 which extends through alined apertures 51 in collar 46 and one of three vertically spaced radial bores 52 in the shaft 38. The seat frame 48 may be of any conventional construction but is here shown to be a flanged flat plate which mounts four support brackets 56 that support a conventional seat 58. The brackets 56 could be replaced by any conventional fore-and-aft seat adjuster.

As heretofore described, it is readily apparent that the seat 58, through plate 42 and bearings 44, is pivotable relative to support 32, while the support 32, through bearings 34, is pivotable relative to the platform 10. A latch mechanism 60 is provided for selectively latching the seat 58 and support 32 against pivotal movement, as will now be described with reference to FIG. 2.

Shaft 24 rigidly mounts an annular plate 62 adjacent its upper end and between collars 28 and 30 (FIG. 1). Plate 62 has a pair of diametrically opposed notches 64 and 66 formed therein. The annular plate 42 mounted on shaft 38 includes three arcuately spaced notches 68, 70 and 72. Intermediate the shafts 24 and 38, support 32 mounts a vertical pivot pin 74 which journals a collar 76. A latch lever 78 is welded to collar 76 and mounts at one end a depending latching tab or finger 80 spaced from the pin 74. On the opposite side of collar 76, lever 78 mounts a second depending latching tab or finger 82 which is spaced a greater distance from pin 74 than is finger 80. Outwardly of finger 82, lever 78 includes a handle 84 that extends outwardly of support 32. A tension spring 86 extends between support 32 and handle 84 to bias lever 78 counterclockwise to latching position, as shown in FIG. 2.

Figure 2:
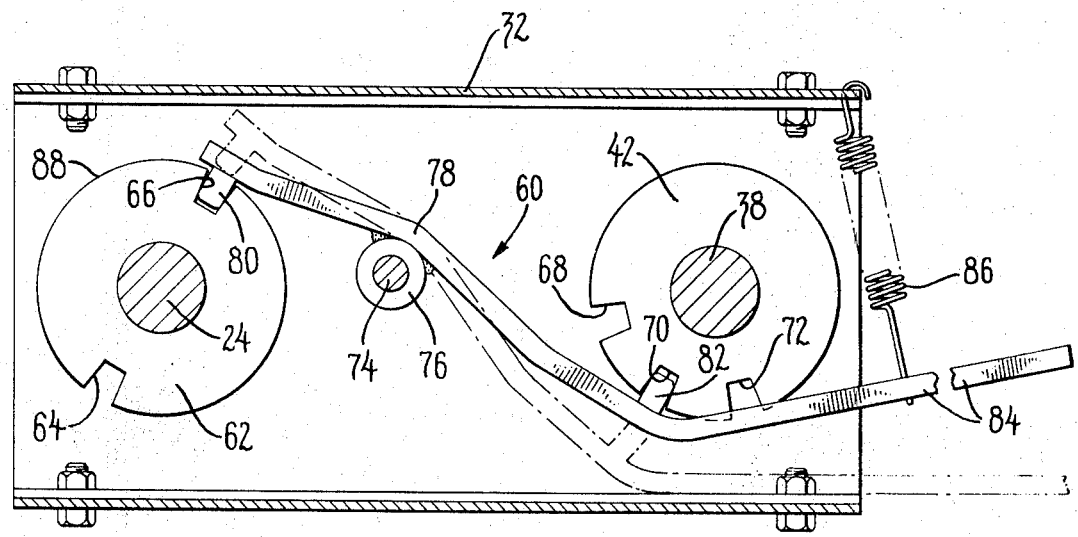
FIG. 2 is an enlarged sectional view taken generally along lines 2-2 of FIG. 1, showing operation of the latch mechanism.

The latching mechanism 60 is operative in the solid line position of FIG. 2 to latch seat 58 in the solid line position of FIG. 1. This results from the interengagement of finger 80 and notch 66 to latch support 32 against pivotal movement relative to platform 10 and from interengagement of finger 82 with notch 70 to latch seat 58 against pivotal movement relative to support 32.

To move the seat from solid line position of FIG. 1 to the reversed phantom line position, an operator, not shown, grasps handle 84 to move latch lever 78 clockwise, as viewed in FIG. 2, against the force of spring 86. This withdraws fingers 80 and 82 from respective notches 66 and 70 to free seat 58 and support 32 for pivotal movement.

Figure 3:
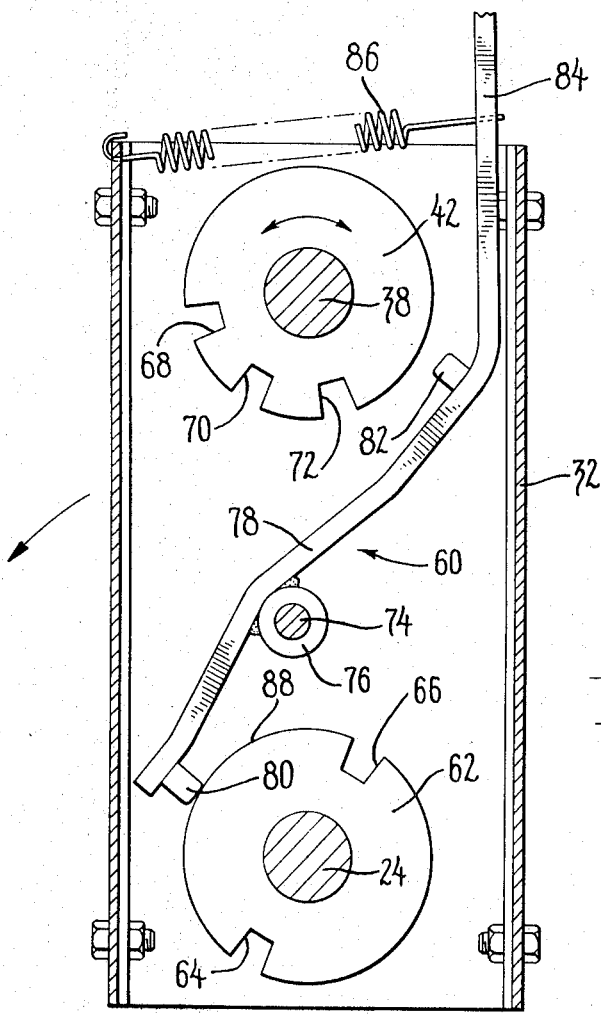
FIG. 3 is a view similar to FIG. 2 showing operation of the latch mechanism to permit pivotal movement and displacement of the seat.

The operator may then simultaneously pivot seat 58 and support 32 and release handle 84 as shown in FIG. 3. Upon release of handle 84 during pivotal movement, finger 80 engages and slides on the outer peripheral surface 88 of plate 62. This holds finger 82 out of engagement with the notches 68, 70 and 72. Upon 180° movement of support 32, it is readily apparent that finger 80 will enter notch 64 to latch support 32 to the platform 10 in the reversed phantom line position of FIG. 1. The now displaced seat 58 may then be oriented and finger 82 latchingly engage one of the notches 68, 70 or 72 to latch the seat to the support 32.

Figure 5:
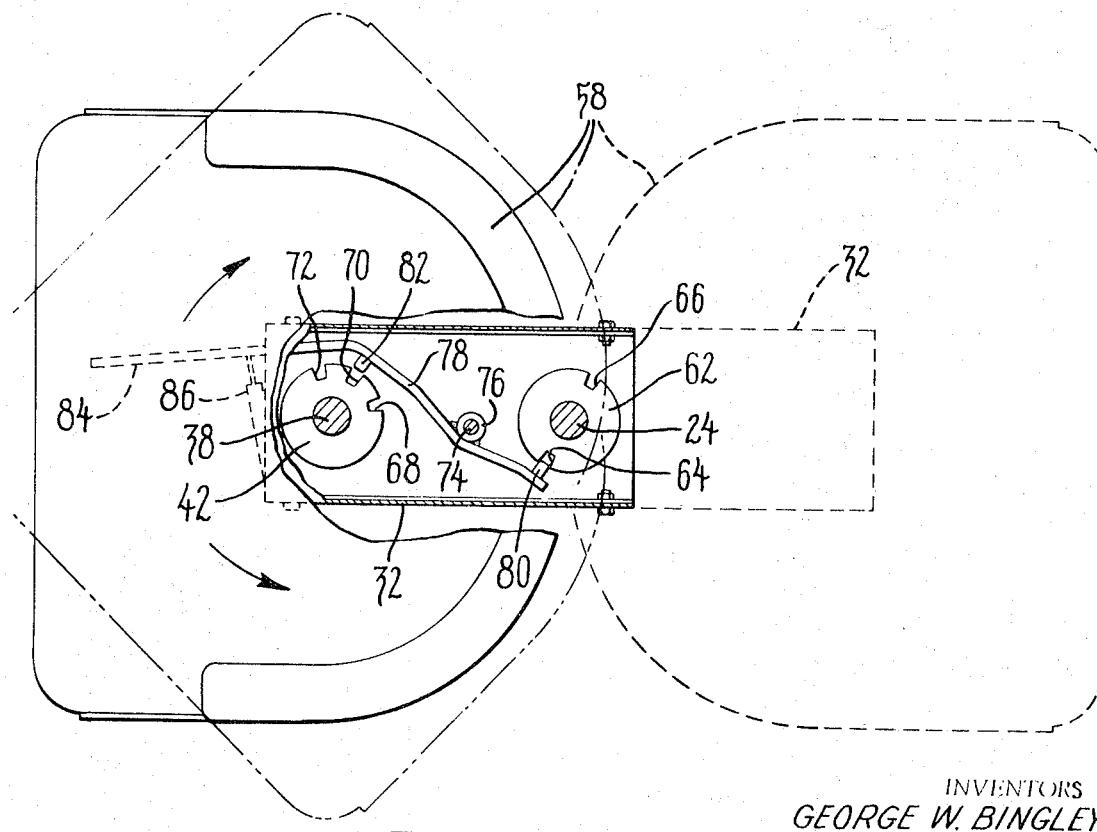
FIG. 5 is a partially broken away plan view of the seat assembly, showing operation of the latch mechanism to permit pivotal movement only of the seat.

While support 32 is in either position, it may be desirable to angularly reposition seat 58. Latch mechanism 60 may be operated so that seat 58 can move independently of movement of support 32, as will now be described with reference to FIG. 5. It was previously noted that the distance from collar 76 to finger 82 was greater than the distance from collar 76 to finger 80. Thus, movement of latch lever 78 sufficiently to withdraw finger 82 from one of notches 68, 70 or 72 will only partially withdraw finger 80 from either notch 66 or 64. Although seat 58 is free to pivot, support 32 remains latched to platform 10. After a new seat position is attained, handle 84 is released and finger 82 will engage either notch 68 or 72 to latch the seat in the angled right position shown in phantom lines in FIG. 5, or in an angled left position.

Thus the movable seat assembly according to this invention permits a seat to be concurrently pivoted and displaced, to be pivoted only without displacement at the selection of the operator. This is possible because of the latching mechanism which is movable between three positions, latching both the seat and support against movement, latching only the support and freeing the seat, or freeing both the seat and the support. While only a preferred embodiment of this invention is shown and described, obvious modifications are contemplated within the scope of the appended claims.

We claim:

1. A movable seat assembly for a vehicle, comprising:
a support;
means mounting the support on the vehicle for pivotal movement relative thereto;
a seat;
means mounting the seat on the support for pivotal movement relative thereto; and
latch means movable between a first position securing the seat against pivotal movement relative to the support and securing the support against pivotal movement relative to the vehicle, a second position permitting pivotal movement of the seat relative to the support and securing the support against pivotal movement relative to the vehicle, and a third position permitting both pivotal movement of the seat relative to the support and pivotal movement of the support relative to the vehicle.

2. The movable seat assembly of claim 1, wherein: the latch means includes a latch member mounted on the seat, a second latch member mounted on the vehicle, and a third latch member mounted on the support, the third latch member engaging the first and second latch members in the first position, engaging the second latch member and disengaging the first latch member in the second position, and disengaging both the first and second latch members in the third position.

3. The movable seat assembly of claim 2, wherein: the second latch member includes means for engaging the third latch member in two positions to permit latching of the support to the vehicle in two arcuately spaced positions.

4. The movable seat assembly of claim 3, wherein: the first latch member includes means for engaging the third latch member in a plurality of positions to enable latching of the seat to the support in a plurality of arcuately spaced positions.

5. The movable seat assembly of claim 2, wherein: the first latch member includes a plate mounted on the seat and having a notch formed therein; the second latch member includes a second plate mounted on the vehicle and having a pair of arcuately spaced notches formed therein; and the third latch member includes a lever pivoted intermediate its ends to the support, a finger mounted adjacent one end of the lever a distance spaced from the pivot for engaging the second plate notches, a second finger mounted adjacent the other end of the lever and spaced from the pivot a distance greater than the first finger spacing distance for engaging the first plate notch, and an operator for pivoting the lever, whereby pivotal movement of the lever from the first position effects a sequential disengagement of the second finger from the first plate notch and then disengagement of the first finger from the second plate notch.

6. The movable seat assembly of claims 2, 3, 4 or 5, wherein: the latch means include blocking means to block latching engagement of the first and third latch members until the second and third latch member have engaged.

7. The movable seat assembly of claim 6, wherein: the blocking means include circular lands formed on the second plate between the notches and engageable with the first finger after disengagement of the first finger and second plate notches and upon pivotal movement of the support to hold the lever in the third position and block engagement of the second finger with the first plate notch to enable free pivotal movement of the seat relative to the support during pivotal movement of the support relative to the vehicle.

8. The movable seat assembly of claim 7, including: means biasing the lever to the first position.

9. A movable seat assembly for a vehicle, comprising:
a support;
means mounting the support on the vehicle for pivotal movement relative thereto;
a seat;
means mounting the seat on the support for pivotal movement relative thereto; and
latch means having a first condition in which the seat is secured against pivotal movement relative to the support and the support is secured against pivotal movement relative to the vehicle, a second condition in which the seat is pivotable relative to the support and the support is secured against pivotal movement relative to the vehicle, and a third condition in which the seat is pivotable relative to the support and the support is pivotable relative to the vehicle.